US012711761B2

(12) United States Patent
Kum et al.

(10) Patent No.: US 12,711,761 B2
(45) Date of Patent: Aug. 18, 2026

(54) SYSTEM AND METHOD FOR ANALYZING TIME SERIES GROWTH OF CROPS BASED ON RECEPTACLE ANALYSIS AND TRACKING

(71) Applicant: Korea Electronics Technology Institute, Seongnam-si (KR)

(72) Inventors: Seung Woo Kum, Yongin-si (KR); JaeWon Moon, Seoul (KR); Seung Taek Oh, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 256 days.

(21) Appl. No.: 18/607,138

(22) Filed: Mar. 15, 2024

(65) Prior Publication Data

US 2024/0355118 A1 Oct. 24, 2024

Related U.S. Application Data

(63) Continuation of application No. PCT/KR2023/010773, filed on Jul. 25, 2023.

(30) Foreign Application Priority Data

Apr. 20, 2023 (KR) ........................ 10-2023-0052166

(51) Int. Cl.

| | |
|---|---|
| ***G06V 20/10*** | (2022.01) |
| ***G06V 10/62*** | (2022.01) |
| ***G06V 10/74*** | (2022.01) |
| ***G06V 10/762*** | (2022.01) |

(52) U.S. Cl.

CPC ............ *G06V 20/188* (2022.01); *G06V 10/62* (2022.01); *G06V 10/761* (2022.01); *G06V 10/762* (2022.01)

(58) Field of Classification Search

None

See application file for complete search history.

(56) References Cited

FOREIGN PATENT DOCUMENTS

| | | | | | |
|---|---|---|---|---|---|
| KR | 10-2014-0147343 | A | | 12/2014 | |
| KR | 10-2017-0052416 | A | | 5/2017 | |
| KR | 20170056731 | A | * | 5/2017 | ............ G06Q 50/02 |
| KR | 10-2018-0086832 | A | | 8/2018 | |
| KR | 10-2018-0121032 | A | | 11/2018 | |

(Continued)

OTHER PUBLICATIONS

"An Automated, Clip-Type, Small Internet of Things Camera-Based Tomato Flower and Fruit Monitoring and Harvest Prediction System"; Unseok Lee et al; Sensors 2022, 22, 2456; https://doi.org/10.3390/s22072456; Mar. 23, 2022. (Year: 2022).*

*Primary Examiner* — David Ometz

(74) *Attorney, Agent, or Firm* — Knobbe, Martens, Olson & Bear, LLP

(57) ABSTRACT

A receptacle analysis and tracking-based time series crop growth analysis method is proposed. The method may include acquiring a crop image representing an image of a crop taken by a camera, and recognizing from the crop image predetermined unit objects included in the crop. The method may also include clustering the predetermined unit objects to form a plurality of clusters, and reconstructing the plurality of clusters on the basis of a receptacle unit. The method may further include generating linkage information between the unit objects and clusters or between the plurality of clusters in each image having different temporal information.

12 Claims, 4 Drawing Sheets

(56) References Cited

FOREIGN PATENT DOCUMENTS

| | | | | | |
|---|---|---|---|---|---|
| KR | 20180121032 | A | * | 11/2018 | ............... G06T 7/11 |
| KR | 20200056520 | A | * | 5/2020 | ............. G06Q 50/02 |
| KR | 20200080432 | A | * | 7/2020 | ......... G01N 33/0098 |
| KR | 20200144905 | A | * | 12/2020 | ............. G06Q 50/02 |
| KR | 10-2022-0168913 | A | | 12/2022 | |

* cited by examiner

SYSTEM AND METHOD FOR ANALYZING TIME SERIES GROWTH OF CROPS BASED ON RECEPTACLE ANALYSIS AND TRACKING

CROSS REFERENCE TO RELATED APPLICATIONS

This is a continuation application of International Patent Application No. PCT/KR2023/010773 filed on Jul. 25, 2023, which claims priority to Korean patent application No. 10-2023-0052166 filed on Apr. 20, 2023, contents of both of which are incorporated herein by reference in their entireties.

BACKGROUND

Technical Field

The present disclosure relates to a method for time series crop growth analysis based on receptacle analysis and tracking.

Description of Related Technology

Various deep learning-based image recognition technology services are being activated, and the application of these technologies is expanding not only in the IT field, but also in various fields such as manufacturing, agriculture, etc.

SUMMARY

One aspect is a system and method for time series crop growth analysis based on receptacle analysis and tracking, which enables efficient crop tracking through reflection of characteristics of crops growth in a tracking technology for crops growth analysis by confirming the compositions of the receptacles using image analysis technology such as deep learning.

Another aspect is a receptacle analysis and tracking-based time series crop growth analysis method that includes: acquiring an image of a crop (also referred to as a crop image) taken by a camera; recognizing from the crop image predetermined unit objects included in the crop; clustering the unit objects to form a plurality of clusters; reconstructing the plurality of clusters on the basis of a receptacle unit; and generating linkage information between the unit objects and clusters or between the plurality of clusters in each image having different temporal information.

In some embodiments of the present disclosure, the recognizing of, from the crop image, the predetermined unit objects contained in the crop may include: recognizing predetermined objects included in the crop from the crop image; and recognizing the predetermined objects as unit objects identified by growth stages.

In some embodiments of the present disclosure, the clustering of the unit objects to form the plurality of clusters may include: calculating information about a distance between a first unit object and a second unit object among the unit objects; and constructing the first and second unit objects into a cluster if the distance information is within a predetermined threshold distance, In some embodiments of the present disclosure, the reconstructing of the plurality of clusters on the basis of the receptacle unit may include reconstructing the plurality of clusters on the basis of the receptacle unit if the number of unit objects included in the cluster is greater than or equal to the minimum number of unit objects.

In some embodiments of the present disclosure, the reconstructing of the plurality of clusters on the basis of the receptacle unit may include: detecting a stem for any one unit object in the cluster; detecting a first junction of points where the detected stem extends; and reconstructing the consecutive unit objects at the first junction on the basis of a single receptacle unit.

In some embodiments of the present disclosure, the reconstructing of the consecutive unit objects at the first junction on the basis of the single receptacle unit may include: reconstructing the consecutive unit objects at the first junction on the basis of the single receptacle unit if the number of unit objects satisfies at least the minimum number of unit objects to constitute the receptacle unit.

In some embodiments of the present disclosure, the detecting of the stem for any one unit object in the cluster may include: detecting the stem for the unit object by detecting a straight or curved stem in an upward direction relative to a boundary of the unit object by tracking an energy-maximized path relative to the boundary of the unit object.

Some embodiments of the present disclosure may further include: separately storing information of the recognized unit object and information of the reconstructed cluster, wherein the information of the unit object includes a unit object index, a class, a location on the crop image, and a crop image acquisition time, and wherein the information of the cluster includes a cluster index, a list of unit objects in the cluster, information of a location of a cluster center point on the crop image, information of a cluster size on the crop image, and a crop image acquisition time.

In some embodiments of the present disclosure, the generating of the linkage information between the unit objects and clusters or between the plurality of clusters having different temporal information in each crop image may include: acquiring location information of the at least one unit object identified from the crop image at a first time point; acquiring location information of the plurality of clusters identified from the crop image at a second time point subsequent to the first time point; extracting a cluster having a closest distance from the plurality of clusters having a predetermined threshold distance from the location information of the unit object; and generating linkage information for the extracted cluster and the unit object.

In some embodiments of the present disclosure, the extracting of, among the plurality of clusters, the cluster having the closest distance from the location information at the first time point may include: comparing a growth stage of the unit object at the first time point with a maximum-growth stage in the cluster having the closest distance; and extracting the cluster located at the next closest distance if the cluster having the closest distance has a maximum-growth stage that is earlier than the growth stage of the unit object.

In some embodiments of the present disclosure, the generating of the linkage information between the unit objects and clusters or between the plurality of clusters having different temporal information in each crop image may include: acquiring location information of respective unit objects in the cluster identified from the crop image at the first time point; acquiring location information of the cluster identified from the crop image at the second time point subsequent to the first time point; extracting a cluster at the second time point having a closest distance and falling within a predetermined threshold distance for respective unit objects at the first time point; and generating linkage information between the extracted cluster and the respective unit object.

In some embodiments of the present disclosure, the extracting of the cluster at the second time point having the closest distance for respective unit objects at the first time point may include: comparing a maximum-growth stage of the respective unit objects at the first time point and a maximum-growth stage of the cluster having the closest distance; and extracting a cluster located at the next closest distance if the cluster having the closest distance has a maximum-growth stage earlier than the maximum-growth stage of the unit object.

Another aspect is a receptacle analysis and tracking-based time series crop growth analysis system that includes: a communication module configured to receive an image of a crop taken by a camera; a memory in which a program for analyzing the crop image to generate linkage information about the crop is stored; and a processor configured to, upon executing the program stored in the memory, recognize predetermined unit objects included in the crop from the crop image, cluster the unit objects to form a plurality of clusters, reconstruct the plurality of clusters on the basis of a receptacle unit, and generate linkage information between the unit objects and the clusters or between the plurality of clusters in each image having different time information.

In addition to these, there may be further provided other methods and systems for implementing the present disclosure, and computer-readable recording media recording computer programs thereon for executing the methods.

According to embodiments of the present disclosure as described above, it is possible to record the staged crop growth characteristics based on the crop image and to enable timely appropriate crop management, in particular, through a receptacle tracking technology.

The effects of the present disclosure are not limited to those mentioned above, and other effects not mentioned will be apparent to one of ordinary skill in the art from the following description.

DETAILED DESCRIPTION

Figure 1:
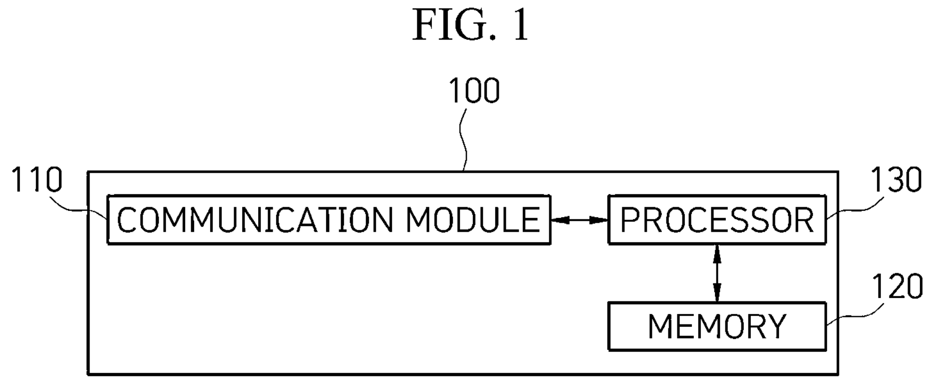
FIG. 1 is a block diagram illustrating a time series crop growth analysis system based on receptacle analysis and tracking according to an embodiment of the present disclosure.

The application of deep learning-based image recognition technology in the agricultural field is slow. This is because the object of analysis does not have a fixed shape and it is difficult to reflect the continuously changing characteristics of crops.

In the case of strawberries as an example, although it is enough to analyze the characteristics of corps, such as strawberries, flowers, or the like, in a single image, due to very high similarity of objects, it is difficult to apply technologies such as object tracking in analyzing the growth of strawberries.

The advantages and features of the present disclosure and methods of achieving them will become apparent upon reference to embodiments described in detail in conjunction with the accompanying drawings. However, the present disclosure is not limited to the embodiments disclosed herein and will be implemented in many different forms. These embodiments are provided merely to make the present disclosure complete and to fully inform one of ordinary skill in the art to which the invention belongs of the scope of the invention, and the invention is defined by the scope of the claims.

The terms used herein are intended to describe embodiments, rather than limiting the invention. In this specification, the singular form includes the plural form unless the context specifically states otherwise. The words "comprises" and/or "comprising" as used herein do not exclude the presence or addition of one or more other components in addition to those mentioned. Like part numbers refer to like components throughout the drawings, and "and/or" includes each and every combination of one or more of the recited components. Although the terms first, second, and the like are used to describe various components, the components are not limited by these terms. These terms are used only to distinguish one component from other components. Thus, a first component referred to herein may also be a second component within the technical scope of the present disclosure.

Unless otherwise defined, all terms used in this specification (including technical and scientific terms) are intended to be used in the sense commonly understood by one of ordinary skill in the technical field to which the invention belongs. In addition, definitions defined by commonly used dictionary are not to be construed ideally or excessively unless expressly defined.

In the following, in order to help those skilled in the art understand the present disclosure, the background in which the present disclosure was conceived will be described first, and then the present disclosure will be described in detail. The present disclosure will be described using strawberries as an example. However, the crop illustrated in the present disclosure is not necessarily limited to strawberries, so the present disclosure may target any crop (raspberries, blackberries, etc.) so long as it has small berries that together form a bunch, i.e., a receptacle.

With the advancement of deep learning technology, various image analysis techniques are being developed and utilized. In the agricultural field, similar technologies are being developed to analyze the characteristics and growth of crops based on images. However, there is a disadvantage that it is difficult to apply general image analysis technology in the agricultural field because it targets living organisms.

Although the recognition of each object is at a very high level, the application of image analysis technology for growth analysis is very limited. This may be caused from the following reasons.

First, it is difficult to identify the unique characteristics of each object itself. Using strawberries as an example, it is difficult to find the features that distinguish between respective strawberries. For example, it needs to be able to find out how much a strawberry in a photo taken yesterday has changed from a photo taken today in the same location, which makes it very difficult to apply tracking through object characteristics.

Second, there is a problem that objects are constantly changing their position due to growth and agricultural activities.

In other words, crops are living things that are of a continuously changing shape. For example, if an object recognized at (30, 100) in the image coordinates moves to (50, 120) in the second image over time, and a new object is recognized at the same location (30, 100), it becomes ambiguous for conventional image processing techniques to determine which object is recognized at (30, 100) in the second image.

In addition, the leaves are continuously moving due to the effects of sunlight, wind, etc., which interferes with the tracking of the object.

In addition, farmers' farming activities also contribute to the difficulty of object recognition. For example, leaf thinning, pruning, and fruit harvesting are major factors that disrupt the continuity between acquired images.

Due to these characteristics of crops, there are limitations in tracking changes in crops using common tracking techniques.

To solve these problems, an embodiment of the present disclosure aims at providing a receptacle-based growth tracking technology utilizing the growth characteristics of crops. Strawberries are characterized by the fact that they do not bear berry as a single entity, but rather as a receptacle of about five berries emanating from the end of a single branch. Furthermore, berries from a single receptacle share a very similar ripening stage. The embodiment of the present disclosure may provide crop growth tracking technology through the reflection of such receptacle-based characteristics.

Furthermore, an embodiment of the present disclosure may provide receptacle-based analytical information, such as the location of the receptacle, the number of receptacles, the number of unit objects contained in the receptacle, and the growth stage of each unit object, from crop images. In addition, how the existing receptacles have changed over time may be generated as linkage information and tracked to enable the analysis of the continuous growth characteristics of objects.

Hereinafter, a time series crop growth analysis system based on receptacle analysis and tracking according to an embodiment of the present disclosure will be described with reference to FIG. 1.

FIG. 1 is a block diagram illustrating a time series crop growth analysis system (100, also referred hereinafter to as a 'growth analysis system') based on receptacle analysis and tracking according to an embodiment of the present disclosure.

The growth analysis system 100 according to the embodiment of the present disclosure includes a communication module 110, a memory 120, and a processor 130.

The communication module 110 may receive crop images, taken by a camera, directly from the camera, or may receive crop images, taken by a camera, from a storage medium on which the crop images are stored. In addition, the communication module 110 may support data transmission/reception between internal components or with external devices. Such a communication module 110 may include both a wired communication module and a wireless communication module. The wired communication module may be implemented as power line communication devices, telephone line communication devices, cable home (MoCA), Ethernet, IEEE1294, integrated wired home networks, and RS-485 control devices. In addition, the wireless communication module may include modules for implementing functions such as wireless LAN (WLAN), Bluetooth, HDR WPAN, UWB, ZigBee, Impulse Radio, 60 GHz WPAN, Binary-CDMA, wireless USB technology, and wireless HDMI technology, as well as fifth generation communication (5G), long term evolution-advanced (LTE-A), long term evolution (LTE), and wireless fidelity (Wi-Fi).

The memory 120 stores programs for analyzing crop images to generate linkage information about crops. As used herein, the memory 120 collectively refers to both non-volatile and volatile storage devices that retain stored information even when not powered. For example, the memory 120 may include NAND flash memory, such as compact flash (CF) cards, secure digital (SD) cards, memory sticks, solid-state drives (SSD), and micro SD cards, magnetic computer memory devices, such as hard disk drives (HDD), and optical disc drives, such as CD-ROMs, DVD-ROMs, and the like.

The processor 130 may execute software, such as programs, to control at least one other component (e.g., hardware or software component) of the growth analysis system 100 and may perform various data processing or computations.

The processor 130 may recognize predetermined unit objects included in a crop from the crop images, cluster the unit objects to form a plurality of clusters, reconstruct the plurality of clusters on the basis of receptacle units, and generate linkage information between the unit objects and the clusters or between the plurality of clusters in respective images having different temporal information.

On the other hand, in an embodiment of the present disclosure, the processor 130 may utilize at least one of machine learning, neural network, or deep learning algorithms as an artificial intelligence algorithm for analyzing the crop images, and examples of neural networks may include models such as convolutional neural networks (CNN), deep neural networks (DNN), and recurrent neural networks (RNN).

Figure 2:
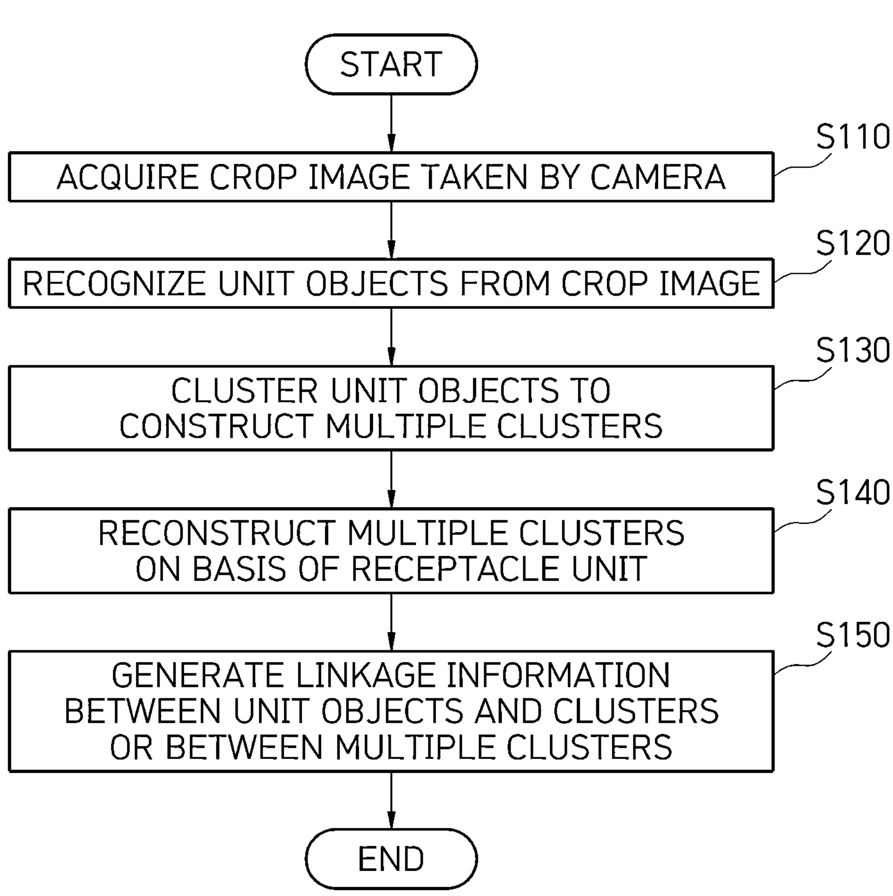
FIG. 2 is a flowchart illustrating a time series crop growth analysis method based on receptacle analysis and tracking according to an embodiment of the present disclosure.
Figure 3:
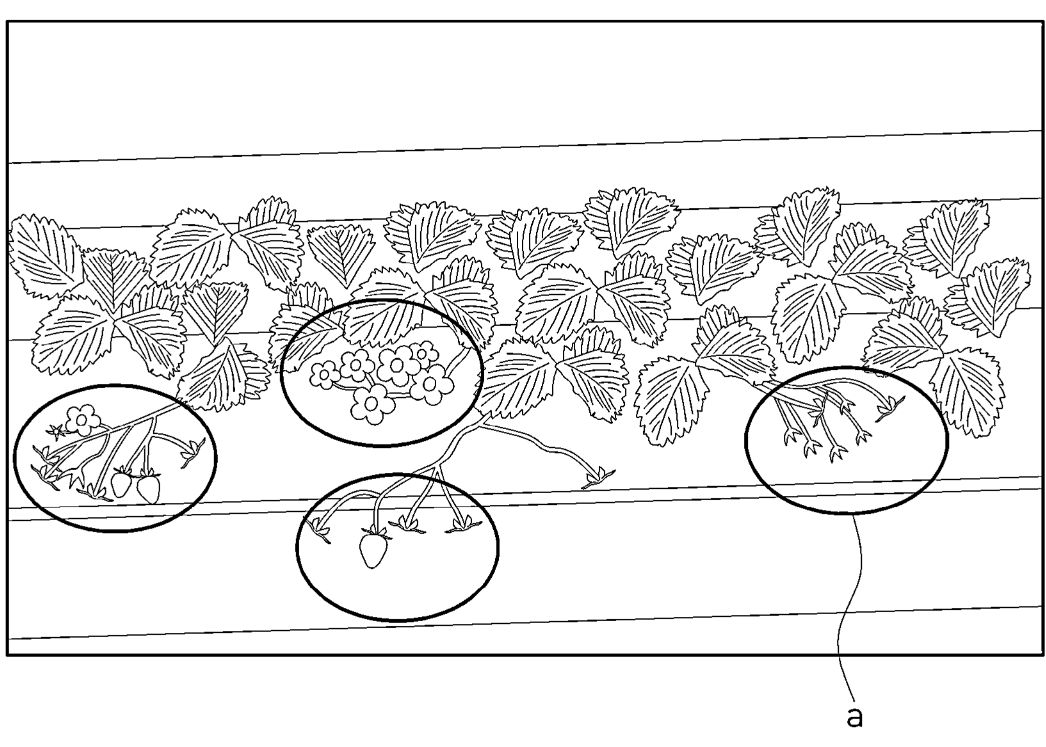
FIG. 3 is a diagram illustrating an example of a clustered state in an embodiment of the present disclosure.
Figure 4:
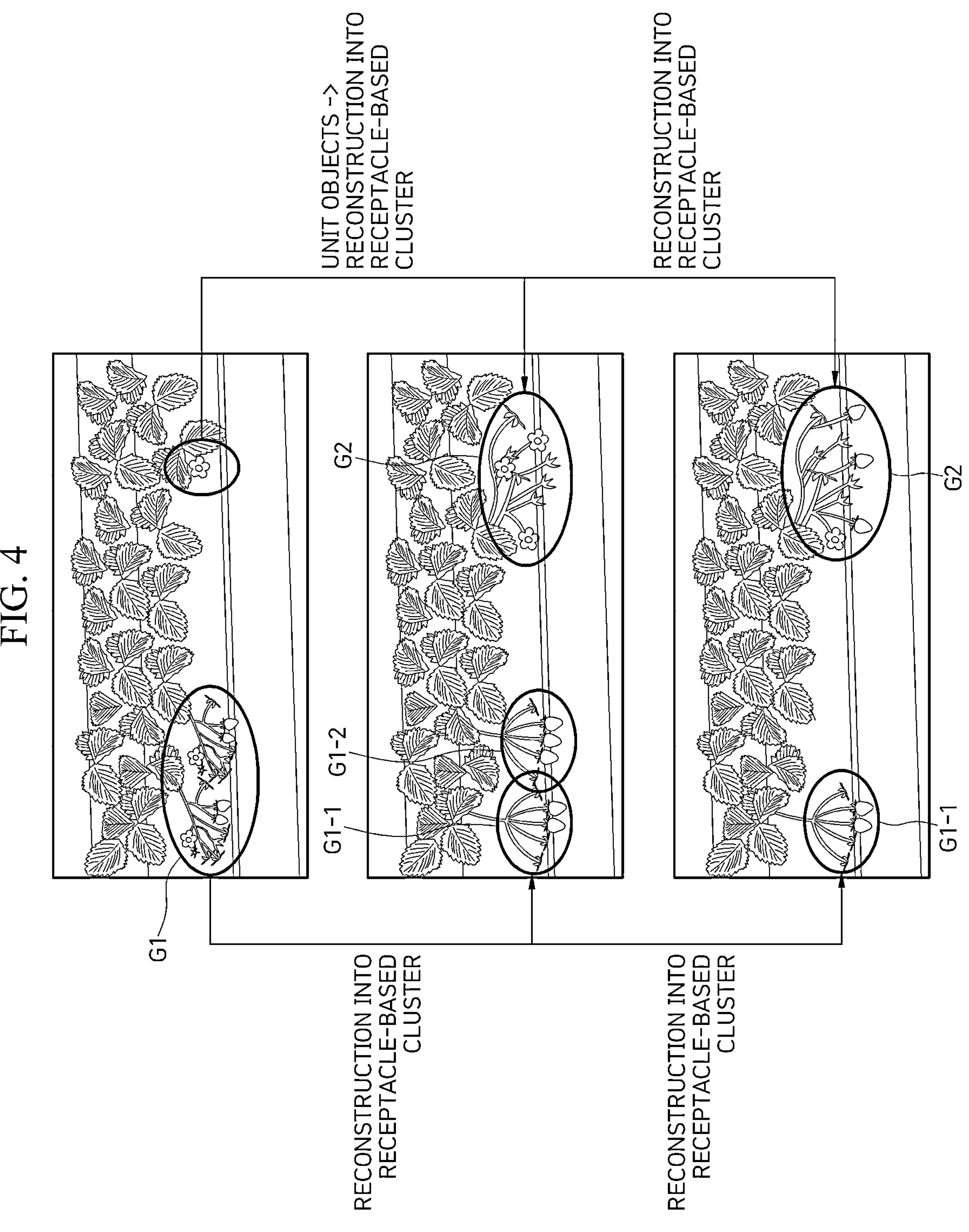
FIG. 4 is a diagram illustrating the generation of linkage information in an embodiment of the present disclosure.

Referring now to FIGS. 2 to 4, a method performed by the growth analysis system 100 according to the embodiment of the present disclosure will be described in detail.

FIG. 2 is a flowchart illustrating a time series crop growth analysis method based on receptacle analysis and tracking according to an embodiment of the present disclosure.

First, an image of a crop taken by a camera is obtained (S110). Step S110 may be performed in various forms, such as acquiring the crop image by directly controlling the camera, or acquiring the same by receiving a stored crop image.

Next, a predetermined unit object of the crop is recognized from the crop image (S120).

At this time, the present disclosure may recognize the predetermined objects of the crop from the crop image, and then recognize the predetermined objects as unit objects identified by growth stages. In other words, the unit objects mean that the objects recognized from the crop image are identified by growth stages. For example, in the case of a strawberry crop, the unit objects may be identified into buds, flowers, fertilized strawberries, unripe strawberries, ripe strawberries, etc. In other words, an embodiment of the present disclosure does not simply recognize the unit objects as strawberries or flowers, but specifically identifies them according to their growth stages, such as buds, flowers, fertilized strawberries, unripe strawberries, ripe strawberries, etc.

Next, the unit objects are clustered to generate a plurality of clusters (S130).

In an embodiment, the present disclosure may calculate distance information between a first unit object and a second unit object among the unit objects, and organize the first and second unit objects into a cluster if the distance information is within a preset threshold distance.

FIG. 3 is a diagram illustrating an example of a clustered state in an embodiment of the present disclosure.

FIG. 3 illustrates an example of clustering (a) for recognized unit objects. Clustering is performed by calculating image distance information on the image between respective unit objects, and grouping unit objects that are close together. In an embodiment of the present disclosure, clustering may be performed by k-means clustering or the like.

Next, the plurality of clusters is reconstructed into receptacle-based clusters (S140). Since the clusters constructed in step S120 are clusters of unit objects simply based on distance, it is necessary to check the configuration of respective receptacles for the clustered objects. For example, in the case of a strawberry crop, it is important to reconstruct the clusters based on receptacles because each receptacle has a different ripening time and harvest time of strawberries.

A receptacle consists of a unit object connected with multiple stems from a single branch. In order to reconstruct the clusters as such receptacle-based clusters, an embodiment of the present disclosure may reconstruct the clusters as receptacle-based clusters if the number of unit objects in the cluster is at least the minimum number of unit objects. In the example of strawberries, the unit receptacle of strawberries may contain at least five unit objects. Therefore, if the number of unit objects in the cluster constructed in the previous step is less than 5, the minimum number of unit objects, it is considered that the receptacle is not constructed. That is to say, the cluster is not treated as a cluster, but as individual unit objects.

In conjunction with or independently of this, an embodiment of the present disclosure, in order to reconstitute a cluster on the basis of a receptacle unit, detects a stem for any unit object in the cluster, and detects a first junction among the points where the detected stem is continuous. Then, the consecutive unit objects at the detected first junction may be reconstructed into a single receptacle unit.

At this time, an embodiment of the present disclosure may apply various image processing techniques to track stems from unit objects, such as an energy maximization technique. In other words, an embodiment of the present disclosure may apply an energy maximization technique to track a specific object (stem) in a crop image. That is, an embodiment of the present disclosure may detect a stem that is straight or curved in an upward direction relative to the boundary of a unit object. Here, the stem for a unit object may be detected by tracing a path along which energy is maximized relative to the boundary of the unit object.

In applying the above energy maximization technique, if the number of consecutive unit objects at the first junction satisfies at least the minimum number of unit objects to constitute a receptacle unit, the cluster may be reconstructed as a receptacle-based cluster.

On the other hand, an embodiment of the present disclosure may record crop growth information for the receptacle-based classification after the clusters are reconstructed as the receptacle-based clusters. In other words, the recognized cluster information should be systematically recorded through the receptacle-based reconstruction process in order to utilize the growth information.

To this end, an embodiment of the present disclosure may separately store information about recognized unit objects and information about reconstructed clusters.

Here, the information about the unit objects means objects that are not included in the clustering classification, i.e., objects before they are included in the receptacle unit. The information about the unit objects may include at least one of the following information: a unit object index, a class (object classification), a location on the crop image, and a crop image acquisition time.

Further, the information about a cluster may include at least one of a cluster index, a list of unit objects in the cluster, information about a location of a cluster center point on the crop image, information about a size of the cluster on the crop image, and a crop image acquisition time. Here, the list of unit objects in the cluster may include a class of the unit objects and a location on the crop image of each unit object. Further, the center point location information may be defined while reflecting a distribution of the unit objects.

Referring again to FIG. 2, linkage information between a unit object and a cluster, or between a plurality of clusters, in each crop image having different temporal information is generated (S150).

FIG. 4 is a diagram illustrating the generation of linkage information in an embodiment of the present disclosure.

Step S140 is to store the information for each crop image with the reflection of the temporal characteristics of the clustering. For example, a single unit object (flower) may be identified as having transitioned to a single cluster (receptacle) in an image acquired several days later, allowing linkage information to be tracked between the unit object and the cluster, or between multiple clusters.

FIG. 4 illustrates three crop images taken continuously at the same location. In the top crop image, a left cluster (G1) and a right unit object (O) are recognized; in the middle crop image, three clusters (G1-1, G-1-2, G2) are recognized; and in the bottom crop image, two clusters (G1-1, G2) are equally recognized.

In order to provide useful information to the farmers in this process, it is necessary to provide information about whether the clusters (G1, G1-1, G1-2) on the left side of each crop image are the same clusters and how they have changed. Furthermore, it is necessary to provide information on how the unit object (O) on the right is clustered (G2) and how it has changed.

To this end, an embodiment of the present disclosure may generate and provide linkage information between unit objects and clusters.

Specifically, location information of at least one unit object identified from a crop image at a first time point is obtained, and then location information of a plurality of clusters identified from a crop image at a second time point subsequent to the first time point is obtained.

Then, among the plurality of clusters having a predetermined threshold distance from the location information of the unit object, a cluster having a closest distance may be extracted, and linkage information may be generated for the extracted cluster and the unit object. In other words, the cluster for generating the linkage information needs to have a center location within the predetermined threshold distance from the location information of the unit object. The linkage information may be a linkage between the ID of a unit object at a first time point and the ID of a cluster at a second time point.

For example, assuming that A is the location information of the unit object identified in the crop image at the first time (t0) and B (0, . . . , N) is the location information (center location) of the cluster identified in the crop image at the second time (t1), the cluster B having the closest distance to A may be extracted. This distance may utilize the Euclidean distance.

In this case, an embodiment of the present disclosure compares the growth stage of the unit object at the first time point with the maximum-growth stage in the cluster with the closest distance, and if the comparison result confirms that the cluster with the closest distance has the maximum-growth stage earlier than the growth stage of the unit object, may extract the cluster located at the next closest distance.

In other words, in the above example, if the growth stage of A is compared with the maximum-growth stage of the clusters and the maximum-growth stage that is earlier than the growth stage of A is confirmed, the cluster is discarded even if it has the closest distance, and if the maximum-growth stage of the next closest cluster proceeds furthermore than the growth stage of A, linkage information may be generated for the next closest cluster.

Further, an embodiment of the present disclosure may generate and provide linkage information between a plurality of clusters.

Specifically, the location information of respective unit objects in the identified cluster is obtained from a crop image at a first time point, and then the location information of the identified cluster is obtained from a crop image at a second time point subsequent to the first time point.

Then, for each of the unit objects at the first time point, the cluster at the second time point that falls within a predetermined threshold distance and has the closest distance is extracted, and linkage information between the extracted clusters and the respective unit objects is generated. At this time, the cluster for generating the linkage information needs to satisfy that the center location of the cluster is within a predetermined threshold distance from the location information of each unit object included in the cluster. Furthermore, the linkage information may be a linkage between the IDs of the unit objects in the cluster at the first time point and the ID of the cluster at the second time point.

For example, assuming that A (0, . . . , N) is the location information (center location) of the cluster identified in the crop image at the first time point (t0) and B (0, . . . , N) is the location information (center location) of the cluster identified in the crop image at the second time point (t1), the cluster B with the closest distance to the unit object A0 may be extracted. The distance at this time may utilize the Euclidean distance.

In this case, an embodiment of the present disclosure compares the maximum-growth stage of each unit object at the first time point with the maximum-growth stage of the cluster with the closest distance, and if the comparison result confirms that the cluster with the closest distance has a maximum-growth stage that is earlier than the maximum-growth stage of the unit object, may extract the cluster located at the next closest distance.

In other words, in the above example, if the maximum-growth stage of A0 is compared with the maximum-growth stage of the cluster B and the maximum-growth stage that is earlier than the growth stage of A is confirmed, the cluster B is discarded even if it has the closest distance, and if the maximum-growth stage of the next closest cluster proceeds furthermore than the maximum-growth stage of A, linkage information may be generated for the next closest cluster.

Generating the linkage information for the cluster may enable more accurate and error-free cluster-based growth characteristic analysis. For example, it is assumed that in an image of a crop at the same location at first and second time points, a single cluster is recognized as present at the first time point, but two clusters are recognized as present at the second time point. Here, by linking the cluster information at first and second time points, staged crop growth characteristics may be confirmed.

In the case of the strawberry example, although a flower having a single receptacle-based cluster is detected at the first time point so that the flower is constructed as a single cluster, even if the flower is actually composed of a unit of two receptacles, it may not be possible to confirm this exactly through image analysis alone. If the information collected and stored in this way is continued to the second time point without modification, when the strawberries with the first receptacle-based cluster are ripe for harvesting and the strawberries with the second receptacle-based cluster are not yet ripe, they are recognized as a single receptacle-based unit (cluster), so it is impossible to provide proper strawberry harvesting information so that the harvesting timing may be missed or shortened too early.

In contrast, an embodiment of the present disclosure has the advantage that by linking the cluster information at the first time point and the second time point, the first cluster (unit object: flower) is recognized as being at the first time point, and the 1-1$^{st}$ cluster (unit object: ripe strawberry) and the 1-2$^{nd}$ cluster (unit object: unripe strawberry) associated with the first cluster are recognized as being at the second time point, thereby enabling continuous tracking of the crop growth characteristics.

In addition, in the above example, if the cluster information for the same location in the crop image at the first and second time points is different, an embodiment of the present disclosure may learn an analysis model by establishing this situation as training data. That is, the number of cluster information at the same location at the first and second time points is calculated respectively, and the difference between them is calculated and stored as error information. Then, the cluster information at the first and second time points corresponding to the error information is set as the input, and the analysis model may be trained so that the cluster information at the first and second time points becomes the same.

Accordingly, it is possible to recognize the provision of two clusters instead of only one cluster at the first time point in the above example, enabling more accurate and continuous cluster tracking. In this case, as training data for the analysis model, peripheral information corresponding to the cluster information included in the crop image taken at the first and second time points (distribution of objects, absolute positions of objects and relative positions between objects, background areas, etc.), area information of the cluster, number of unit objects in the cluster, and information of neighboring clusters and unit objects may be further added and trained.

In an embodiment of the present disclosure, the linkage information may be stored in the form of ID@timestamp, for example. Furthermore, respective unit objects and clusters may be linked to a unit object or cluster identified at other time point (e.g., object1@2020.11.28.T04:28:11→cluster3@2020.12.04.T05.38.11→ . . . ).

In the above description, steps S110 to S150 may be further divided into additional steps or combined into fewer steps, depending on the implementation of the present disclosure. Furthermore, some steps may be omitted as desired, and the order of the steps may be changed. Furthermore, the description of FIG. 1 may be mutually applicable with the description of FIGS. 2 to 4, even if other details are omitted.

The time series crop growth analysis method based on receptacle analysis and tracking according to an embodiment of the present disclosure described above may be implemented as a program (or application) and stored on a medium for execution in combination with a server, which is hardware.

The above-described program may include code coded in a computer language, such as C, C++, JAVA, machine language, or the like, which may be read by a processor (CPU) of a computer through a device interface of the computer to execute the methods implemented in the program. Such a code may include a functional code related to functions or the like that defines the necessary functions to execute the methods, and a control code related to an executable procedure required to allow the processor of the computer to execute the functions in a predetermined procedure. Further, such a code may further include a memory reference related code for at what location (address number) in the internal or external memory of the computer should be referenced by additional information or media necessary for the functions to be executed by the processor of the computer. Further, if the processor of the computer needs to communicate with any other computer or server at a remote location in order to execute the above functions, the code may further include a communication-related code for how to communicate with the other computer or server at the remote location using a communication module of the computer, and what information or media should be sent or received during the communication.

The stored medium refers to a medium that stores data semi-permanently and is readable by a device, rather than a medium that stores data for a short period of time, such as a register, cache, memory, or the like. Specifically, examples of the stored medium include, but are not limited to, ROM, RAM, CD-ROM, magnetic tape, floppy disk, optical data storage, etc. In other words, the program may be stored on various storage media on various servers to which the computer is able to access, or on various storage media on the user's computer. Further, the medium may be distributed across networked computer systems, such that a computer-readable code may be stored in a distributed manner.

The steps of the methods or algorithms described in connection with embodiments of the present disclosure may be implemented directly in hardware, implemented as software modules executed by hardware, or a combination thereof. The software module may reside in random access memory (RAM), read only memory (ROM), erasable programmable ROM (EPROM), electrically erasable programmable ROM (EEPROM), flash memory, hard disk, removable disk, CD-ROM, or any other form of computer-readable storage medium well known in the art to which the present disclosure pertains.

Although embodiments of the present disclosure have been described above with reference to the accompanying drawings, one having ordinary knowledge in the technical field to which the present disclosure belongs will understand that the present disclosure may be implemented into other specific forms without changing its technical ideas or essential features. Therefore, the embodiments described above are to be understood as being exemplary and non-limiting in all respects.

What is claimed is:

1. A receptacle analysis and tracking-based time series crop growth analysis method performed by a computer, the method comprising:

- acquiring a crop image representing an image of a crop taken by a camera;
- recognizing, from the crop image, predetermined unit objects included in the crop;
- clustering the predetermined unit objects to form a plurality of clusters;
- reconstructing the plurality of clusters on the basis of a receptacle unit; and
- generating linkage information between the predetermined unit objects and clusters or between the plurality of clusters in images having different temporal information,
- wherein generating the linkage information comprises:
  - acquiring location information of a unit object among the predetermined unit objects identified from the crop image taken at a first time point;
  - acquiring location information of the plurality of clusters identified from the crop image taken at a second time point subsequent to the first time point;
  - extracting a cluster having a closest distance from the plurality of clusters and having a predetermined threshold distance from the location information of the unit object; and
  - generating the linkage information for the extracted cluster and the unit object.

2. The method of claim 1, wherein the recognizing comprises:

- recognizing the predetermined unit objects included in the crop from the crop image; and
- recognizing the predetermined unit objects as unit objects identified by growth stages.

3. The method of claim 1, wherein the clustering comprises:

- calculating information about a distance between a first unit object and a second unit object among the predetermined unit objects; and
- constructing the first and second unit objects into a cluster in response to the distance information being within a predetermined threshold distance.

4. The method of claim 1, wherein the reconstructing comprises:

- reconstructing the plurality of clusters on the basis of the receptacle unit in response to the number of unit objects included in the cluster being greater than or equal to the minimum number of unit objects.

5. The method of claim 1, wherein the reconstructing comprises:

- detecting a stem for any one unit object in the cluster;
- detecting a first junction of points where the detected stem extends; and
- reconstructing the consecutive unit objects at the first junction on the basis of a single receptacle unit.

6. The method of claim 5, wherein reconstructing the consecutive unit objects comprises:

- reconstructing the consecutive unit objects at the first junction on the basis of the single receptacle unit in response to the number of unit objects satisfying at least the minimum number of unit objects to constitute the receptacle unit.

7. The method of claim 5, wherein detecting the stem comprises:

- detecting the stem for the unit object by detecting a straight or curved stem in an upward direction relative to a boundary of the unit object by tracking an energy-maximized path relative to the boundary of the unit object.

8. The method of claim 1, further comprising:

- separately storing information of the recognized unit object and information of the reconstructed cluster wherein the information of the unit object includes a unit object index, a class, a location on the crop image, and a crop image acquisition time, and wherein the information of the cluster includes a cluster index, a list of unit objects in the cluster, information of a location of a cluster center point on the crop image, information of a cluster size on the crop image, and a crop image acquisition time.

9. The method of claim 1, wherein extracting the cluster having the closest distance comprises:

comparing a growth stage of the unit object at the first time point with a maximum-growth stage in the cluster having the closest distance; and extracting the cluster located at the next closest distance in response to the cluster having the closest distance having a maximum-growth stage that is earlier than the growth stage of the unit object.

10. A receptacle analysis and tracking-based time series crop growth analysis method performed by a computer, the method comprising:

acquiring a crop image representing an image of a crop taken by a camera;

recognizing, from the crop image, predetermined unit objects included in the crop;

clustering the predetermined unit objects to form a plurality of clusters;

reconstructing the plurality of clusters on the basis of a receptacle unit; and generating linkage information between the predetermined unit objects and clusters or between the plurality of clusters in images having different temporal information, wherein the generating comprises:

acquiring location information of respective unit objects in a cluster among a plurality of clusters identified from the crop image taken at a first time point;

acquiring location information of a plurality of clusters identified from the crop image taken at a second time point subsequent to the first time point;

extracting a cluster among the plurality of clusters at the second time point having a closest distance and falling within a predetermined threshold distance for the respective unit objects at the first time point; and generating the linkage information between the extracted cluster and the respective unit objects.

11. The method of claim 10, wherein extracting the cluster at the second time point comprises:

comparing a maximum-growth stage of the respective unit objects at the first time point and a maximum-growth stage of the cluster having the closest distance; and extracting a cluster located at the next closest distance in response to the cluster having the closest distance having a maximum-growth stage earlier than the maximum-growth stage of the unit object.

12. A receptacle analysis and tracking-based time series crop growth analysis system comprising:

a communication module configured to receive a crop image representing an image of a crop taken by a camera;

a memory storing instructions; and a processor configured to execute the instructions to:

recognize predetermined unit objects included in the crop from the crop image, cluster the predetermined unit objects to form a plurality of clusters, reconstruct the plurality of clusters on the basis of a receptacle unit, and generate linkage information between the unit objects and the clusters or between the plurality of clusters in images having different time information, wherein to generate the linkage information, the processor is further configured to execute the instructions to:

acquire location information of a unit object among the predetermined unit objects identified from the crop image taken at a first time point;

acquire location information of the plurality of clusters identified from the crop image taken at a second time point subsequent to the first time point;

extract a cluster having a closest distance from the plurality of clusters and having a predetermined threshold distance from the location information of the unit object; and generate the linkage information for the extracted cluster and the unit object.

* * * * *